United States Patent
Walter et al.

(10) Patent No.: US 12,097,678 B2
(45) Date of Patent: Sep. 24, 2024

(54) SYSTEM FOR CONTINUOUSLY PROCESSING PULVERULENT PRODUCTS

(71) Applicant: Fette Compacting GmbH, Schwarzenbek (DE)

(72) Inventors: Nicolas Walter, Hamburg (DE); Alexander Evers, Bargteheide (DE)

(73) Assignee: Fette Compacting GmbH, Schwarzenbek (DE)

( * ) Notice: Subject to any disclaimer, the term of this patent is extended or adjusted under 35 U.S.C. 154(b) by 289 days.

(21) Appl. No.: 17/724,715

(22) Filed: Apr. 20, 2022

(65) Prior Publication Data

US 2022/0332076 A1 Oct. 20, 2022

(30) Foreign Application Priority Data

Apr. 20, 2021 (DE) .................... 10 2021 109 944.7

(51) Int. Cl.
*B29C 43/06* (2006.01)
*B01F 23/60* (2022.01)
(Continued)

(52) U.S. Cl.
CPC ............ *B30B 11/006* (2013.01); *B01F 23/60* (2022.01); *B01F 33/8052* (2022.01);
(Continued)

(58) Field of Classification Search
CPC ..... B30B 15/30; B30B 15/302; B30B 15/304; B30B 11/005; B01F 33/8051;
(Continued)

(56) References Cited

U.S. PATENT DOCUMENTS

| | | | |
|---|---|---|---|
| 9,713,575 B2* | 7/2017 | Boeckx | ................... A61J 3/10 |
| 2009/0004325 A1* | 1/2009 | Bacher | ................... B29B 7/728 |
| | | | 425/586 |
| 2016/0243781 A1* | 8/2016 | Vandenbroucke | ... A61K 9/2095 |
| 2017/0282477 A1* | 10/2017 | Ozcoban | ............. G01F 23/2928 |

FOREIGN PATENT DOCUMENTS

| | | |
|---|---|---|
| CN | 203557740 U | 4/2014 |
| CN | 107234831 A | 10/2017 |

(Continued)

OTHER PUBLICATIONS

Martinetz et al., "A Continuous Operation Concept for a Rotary Tablet Press Using Mass Flow Operating Points", Chemie Igenieur Technik, Wiley Vch. Verlag, Weinhein, DE; Bd. 89, Nr. 8, Jul. 7, 2017, Seiten 1006-1016, XP071184108, ISSN: 0009-286X, DOI: 10.1002/Cite.201700017.
(Continued)

*Primary Examiner* — Atul P. Khare
(74) *Attorney, Agent, or Firm* — Barclay Damon LLP

(57) ABSTRACT

A system for continuously processing pulverulent products includes at least two system inlets for pulverulent products. A mixer is provided that continuously mixes the pulverulent products received at a mixer inlet into a product mixture that is dispensed at a mixer outlet. A production machine having a filling apparatus continuously processes the product mixture from the mixer outlet into end products dispensed at the machine outlet. A conveyor apparatus conveys the product mixture from the mixer outlet to the machine inlet. The conveyor apparatus includes a first fill level sensor that measures a product mixture fill level in the filling apparatus of the production machine and a second fill level measures a product mixture fill level in a conveyor reservoir. A control apparatus receives measurement data from the first fill level sensor and the second fill level sensor and controls at least one production parameter based on the measurement data.

19 Claims, 4 Drawing Sheets

(51) Int. Cl.

| | | |
|---|---|---|
| *B01F 33/80* | (2022.01) | |
| *B29C 31/02* | (2006.01) | |
| *B29C 31/06* | (2006.01) | |
| *B30B 11/00* | (2006.01) | |
| *B30B 11/02* | (2006.01) | |
| *B30B 11/14* | (2006.01) | |
| *B30B 15/30* | (2006.01) | |
| *B29C 43/34* | (2006.01) | |
| *B29C 43/58* | (2006.01) | |
| *B29K 105/00* | (2006.01) | |

(52) U.S. Cl.
CPC .............. *B29C 31/02* (2013.01); *B29C 31/06* (2013.01); *B29C 43/06* (2013.01); *B30B 11/14* (2013.01); *B30B 15/302* (2013.01); *B29C 2043/3427* (2013.01); *B29C 2043/5833* (2013.01); *B29C 2043/5875* (2013.01); *B29K 2105/251* (2013.01)

(58) Field of Classification Search
CPC ....... B29C 43/34; B29C 43/58; G01F 23/268; B29B 7/726; B29B 13/065
See application file for complete search history.

(56) References Cited

FOREIGN PATENT DOCUMENTS

| | | |
|---|---|---|
| DE | 102017207162 A1 | 10/2018 |
| EP | 2400275 A1 | 12/2011 |
| EP | 3013571 A1 | 5/2016 |
| JP | 2008183168 A | 8/2008 |
| JP | 2017177139 A | 10/2017 |
| JP | 2018130735 A | 8/2018 |
| WO | 2014207510 A1 | 12/2014 |
| WO | 2020/229164 A1 | 11/2020 |
| WO | 2020260600 A1 | 12/2020 |

OTHER PUBLICATIONS

EP 22159376, filed Mar. 1, 2022, European Search Report dated Aug. 26, 2022 (10 pages).

JP 2022-044282, filed Feb. 15, 2017, Notification of Reason(s) for Refusal, Dispatch Date Jul. 11, 2024 (4 pages).

JP 2022-044282, filed Feb. 15, 2017, English translation of Notification of Reason(s) for Refusal, Dispatch Date Jul. 11, 2024 (4 pages).

\* cited by examiner

SYSTEM FOR CONTINUOUSLY PROCESSING PULVERULENT PRODUCTS

CROSS REFERENCE TO RELATED INVENTION

This application is based upon and claims priority to, under relevant sections of 35 U.S.C. § 119, German Patent Application No. 10 2021 109 944.7, filed Apr. 20, 2021, the entire contents of which are hereby incorporated by reference.

TECHNOLOGICAL FIELD

This disclosure relates to a system for continuously processing pulverulent products, comprising at least two system inlets for pulverulent products, a mixer for continuously mixing the pulverulent products. The mixer has at least one mixer inlet connected to the at least two system inlets, and wherein the mixer has a mixer outlet for a product mixture generated from the pulverulent products, further comprising a production machine for continuously processing the product mixture, in particular a rotary press or a capsule filling machine. The production machine has a machine inlet connected to the mixer outlet and a machine outlet for end products produced from the product mixture by the production machine and a conveyor apparatus for conveying the product mixture from the mixer outlet to the machine inlet is arranged between the mixer outlet and the machine inlet.

BACKGROUND

In such systems, for example, pharmaceutical products are processed to form oral solid dosages (OSDs), such as tablets or capsules. Rotary presses or capsule filling machines, for example, are provided as production machines for this. Different pulverulent products, for example, at least one active pharmaceutical ingredient (API) and at least one excipient, are continuously supplied through a plurality of system inlets. These pulverulent products supplied through the system inlets are typically supplied by means of metering apparatuses in metered form to a mixer, which produces a product mixture to be processed in the production machine from the pulverulent products. The pulverulent products can be continuously supplied to one or more inlets of the mixer and mixed in the mixer. The produced product mixture is provided at an outlet of the mixer to be supplied to the production machine. The product mixture supplied through an inlet of the production machine is processed in the production machine to form the respective end products, and the produced end products are provided at the outlet of the production machine, where they can be supplied for further processing, for example, packaging.

Such a system is known, for example, from EP 3 013 571 A1. The components of the system, in particular the inlets, the metering apparatuses, the mixer, and a tablet press, are arranged vertically over each other so that the pulverulent products flow from the inlets and the metering apparatuses to the mixer and the tablet press due to gravity. Such an arrangement has the disadvantage that the system takes up a considerable height of 5 m and more. This requires special production spaces and makes access for operating personnel difficult.

In WO 2020/260600 A1, a system for continuously processing pulverulent products is proposed in which a supply, metering, and mixing module is arranged laterally next to a production machine, for example, a rotary press. This arrangement of the system components next to each other on the same ground has the advantage that the system has a considerably lower height and can thus be used in typical production spaces. At the same time, access for operating personnel is simplified. Due to the arrangement of the system components next to each other, the outlet of the mixer is at a vertically lower level than the inlet of the production machine. Accordingly, the product mixture provided by the mixer must be brought from the lower level to the higher level of the inlet of the production machine. In WO 2020/260600 A1, a preferably pneumatic vacuum conveyor apparatus is proposed for this. This effectively counteracts an undesired unmixing of the ingredients of the product mixture.

For example, in rotary presses, powder material filled into cavities is pressed by means of upper and lower punches to form pellets, in particular tablets. The powder material is filled into the cavities by means of a filling apparatus of the rotary press. Such filling apparatuses usually comprise a filling tube, through which the powder material typically falls due to gravity into a filling chamber, from which it in turn typically reaches the cavities by means of gravity. It is desired here to monitor the fill level in the filling apparatus, in particular in the filling tube, in order to ensure sufficient powder availability at any time. The same applies, for example, for capsule filling machines. It has been proposed to arrange sensors inside the filling tube for this purpose. However, arranging a sensor in the powder material flow leads to disturbances in the powder flow, such as bridging. This can impair the powder availability in an undesired manner.

A rotary tablet press with a capacitive fill level sensor for measuring the powder height in a riser tube that discharges into a feed shoe is known from DE 10 2017 207 162 A1. EP 2 400 275 A1 also describes a device for non-invasive, contactless capacitive fill level measurement of bulk goods in a container. The fill level sensor does not come in contact with the filling medium, the fill height of which is to be determined. Rather, electrodes are provided that are arranged like an unfolded plate capacitor and between which a high-frequency alternating electric field is generated, which penetrates the material to be measured in a non-destructive manner. The capacitance of the capacitor thus formed depends on the permittivity of the filling material. The filling material to be measured here has a different permittivity than air. In this manner, a different coverage height of the sensor surface with the material to be measured leads to a different capacitance of the capacitor. The fill height of the material in the container can be derived from this.

In this case, external interferences, such as external electromagnetic fields or external objects, such as a hand of an operating person in the vicinity of the measuring electrodes, present a problem. To reduce the susceptibility to disruptions from outside influences, it is proposed in EP 2 400 275 A1 to arrange a plurality of measuring electrodes in different horizontal planes which define a measurement surface with a vertical extent, and to provide at least one reference electrode which defines a reference surface with a vertical extent. Each of the plurality of measuring electrodes respectively forms a capacitor together with the reference electrode. At least two capacitors are measured here and the measurement values are put in relationship to each other. Outside influences should be eliminated computationally as sources of disturbance by plausibility checks. The known device, however, has considerable complexity in terms of design and evaluation. The plausibility assessment also does not always offer a reliable result.

To protect from external sources of disturbance in the capacitive fill level measurement, what is known as active shielding is also known in practice, in which an electrode serving as a shield is controlled to the same voltage potential as the measuring electrodes during the measurement. While the influence of external sources of disturbances can be reduced by this active shielding, there is still a need for improved protection against disturbances in the capacitive fill level measurement.

In a system of the type described above with a conveyor apparatus for conveying the product mixture provided at the mixer outlet to a machine inlet of a production machine, fluctuations in the product amount provided at the machine inlet by the conveyor apparatus can occur. For example, the pneumatic vacuum conveyor apparatuses explained above convey the product mixture to the machine inlet cyclically or respectively intermittently. In the process, a vacuum is first generated at the outlet of the conveyor path and a product amount is conveyed through the conveyor line by means of the vacuum. Then, an outlet valve of the conveyor line is opened in order to provide the conveyed product amount to the machine inlet. The outlet valve is then closed and the cycle is repeated. In such conveyor apparatuses, fluctuations in the provided product amount are thus inherent to the system.

It is known that, in particular during long operation of a continuously working system of the type described here, errors in the mass streams of the system components can add up such that these errors must be compensated for in order to maintain proper production operation, for example, by controlling a suitable production parameter of the production machine. This can take place, for example, on the basis of a fill level sensor arranged on the filling apparatus of the production machine. However, control or respectively closed-loop control on the basis of a fill level measurement at the filling apparatus of the production machine is only possible in a satisfying manner when a substantially continuous product stream from the mixer enters into the filling apparatus of the production machine. In practice, and depending on the conveyor apparatus used, this is not the case. These fluctuations make it practically impossible to keep, for example, the fill level in the filling apparatus constant by controlling or respectively regulating a production parameter of the production machine.

BRIEF SUMMARY OF THE INVENTION

Starting from the explained prior art, the object of the invention is therefore to provide a system of the type mentioned above with which the aforementioned problems can be overcome. In particular, the object of the invention is to enable reliable control of at least one production parameter of the production machine even in the case of fluctuations of the product amount provided at the machine inlet by the conveyor apparatus.

For a system of the type mentioned above, the invention achieves the object in that a first fill level sensor for measuring the powder fill level in the filling apparatus is arranged on a filling apparatus of the production machine, and that a second fill level sensor for measuring the powder fill level in the conveyor reservoir is arranged on a conveyor reservoir, arranged between the mixer outlet and the conveyor apparatus, of the conveyor apparatus. A control apparatus is provided which receives the measurement data determined by the first fill level sensor and the second fill level sensor, and which is configured to control at least one production parameter of the production machine on the basis of the received measurement data.

An embodiment of the system according to the invention serves to continuously process pulverulent products, in particular dry pulverulent products. As explained, these can be, for example, pharmaceutical products. The pulverulent products can thus comprise, for example, at least one active pharmaceutical ingredient (API) and at least one excipient. The pulverulent products are supplied to the system through at least two, for example more than two, system inlets. The system inlets can each comprise a metering device with which the supply of the products is metered. The pulverulent products supplied through the system inlets are supplied continuously to the at least one mixer inlet via connecting lines. From the supplied pulverulent products, the mixer continuously generates a product mixture for further processing in the production machine. The product mixture is provided at the mixer outlet and supplied continuously to the machine inlet of the production machine by the conveyor apparatus. It should be noted that the continuous supply refers in particular to continuous processing in contrast to a batch process, which is known per se. The continuous supply by the conveyor apparatus also comprises in particular an intermittent supply, for example, as takes place by means of pneumatic conveyor apparatuses. The production machine can be, for example, a rotary press, in particular a rotary tablet press, which presses the supplied product mixture to form pellets, in particular tablets, in a manner known per se. However, the production machine can also be, for example, a capsule filling machine which fills the product mixture into capsules in a manner known per se. The end products, for example, pellets, in particular tablets, or capsules, produced from the product mixture by the production machine are provided at the machine outlet of the production machine. Further processing can take place, for example, dedusting and/or packaging.

In an embodiment, the system is a continuously working system, which, unlike a system working in accordance with the batch principle, continuously mixes the supplied pulverulent products and processes them into end products, for example, pellets, in particular tablets, or capsules. The system can be contained, for example, with a containment level OEB3 or higher, measured, for example, according to the SMEPAC test (Standardized Measurement for Equipment Particulate Airborne Concentrations).

According to an embodiment, a first fill level sensor for measuring the powder fill level in the filling apparatus is arranged on a filling apparatus of the production machine. A second fill level sensor for measuring the powder fill level in the conveyor reservoir is arranged at a conveyor reservoir of the conveyor apparatus arranged between the mixer outlet and the conveyor apparatus. The measurement data determined by the first fill level sensor and the second fill level sensor are received by a control apparatus of the system and the control apparatus controls at least one production parameter of the production machine on the basis of the received measurement data of both fill level sensors.

The product mixture is supplied to the production machine for processing, in particular the production of end products, via the filling apparatus on which the first fill level sensor is arranged. The filling apparatus comprises here in principle all components arranged between the inlet of the production machine and a part of the production machine processing the supplied product mixture, for example, a die plate of a rotary press. It can comprise in particular a filling tube arranged, for example, vertically, through which the product mixture is conveyed due to gravity. The conveyor reservoir of the conveyor apparatus can, in the simplest case, consist of a tubular portion which is arranged downstream of the mixer outlet, for example, attaches to it. The conveyor reservoir can also be designed, for example, funnel-shaped, for example in the form of a funnel-shaped hopper, the inlet of which is connected to the mixer outlet, and the outlet of which is connected to a conveyor line of the conveyor apparatus. The conveyor reservoir forms a buffer for receiving and providing the product mixture before it is conveyed through the conveyor apparatus to the production machine. The conveyor apparatus conveys the product mixture out of this conveyor reservoir. The conveyor apparatus can comprise a conveyor line, for example, a conveyor hose, through which the product mixture is conveyed.

The invention is based on the idea that, as explained above, fluctuations of a fill level measured in a filling apparatus of the production machine can occur due to the conveying of the product mixture by means of the conveyor apparatus. This makes it difficult to control production parameters of the production machine on the basis of only a fill level measurement downstream of the conveyor apparatus, or respectively makes this practically impossible. Therefore, according to the invention, a second fill level sensor is provided upstream of the conveyor apparatus, which sensor measures the fill level in the conveyor reservoir. On the basis of a correlation of the two measured fill levels, the conveying fluctuation generated for whatever reason by the conveyor apparatus can be detected and compensated for the control. Thus, for example, a temporary overfilling of the filling apparatus with product mixture by the conveyor apparatus, and thus a temporary rise of the measured fill level in the filling apparatus, leads to a correspondingly temporary lowering of the fill level in the conveyor reservoir. The joint consideration of both fill levels detects such fluctuations in the conveyed amount and allows a reliable control of the production machine regardless of such fluctuations. Even when using an intermittently working pneumatic conveyor apparatus, the desired balance of the mass streams in the system can be ensured reliably at any time and thus an endless continuous operation of the system can theoretically be ensured.

The first and second fill level sensors can in principle work according to the same measuring principle. They can be built technically identically. This improves the comparability of the measurement results. The control apparatus can also be a closed-loop control apparatus which regulates, for example, the mass stream through the system by controlling the at least one production parameter of the production machine on the basis of the received measurement data to a desired, in particular constant, value.

According to one embodiment, the mixer outlet can be arranged at a vertically lower level than the machine inlet. In this embodiment, for example, a supply, metering, and mixing module comprising the system inlets, if applicable metering apparatuses, and the mixer can be arranged next to the production machine, in particular on the same ground as the production machine. As explained above, this arrangement leads in an advantageous manner to a low construction height, thus to an opportunity for use in typical production spaces and good access to the system components for operating personnel. At the same time, such an arrangement makes a conveyor apparatus necessary which conveys the product mixture provided at the mixer outlet from the lower level of the mixer outlet to the higher level of the machine inlet of the production machine.

According to another embodiment, the conveyor apparatus can be a pneumatic conveyor apparatus which conveys the product mixture intermittently from the mixer outlet to the machine outlet. The pneumatic conveyor apparatus can be, for example, a dense-phase suction conveyor apparatus. Such pneumatic conveyor apparatuses are particularly well suited for conveying the product mixture, since the risk of an undesired unmixing of the components of the product mixture is minimized. Thus, for example, pulverulent products of different grain sizes can also be reliably conveyed in the form of the respective product mixture without undesired segregation occurring. As explained above, in pneumatic vacuum conveyor apparatuses, for example, first a vacuum is generated cyclically at the outlet of a conveyor line, for example, a conveying hose or a conveying tube, and a first product amount is conveyed through the conveyor line by the vacuum. Then, an outlet valve of the conveyor line is opened in order to let out the conveyed product amount to the machine inlet. After that, the outlet valve is closed again and the cycle begins once more. Thus, in such pneumatic vacuum conveyor apparatuses, a fluctuation of the supplied product amount is inherent to the system in that the product is conveyed, so to speak, in packets and thus intermittently from the mixer outlet to the machine inlet.

According to another embodiment, the control apparatus can be configured to control at least one production parameter of the production machine on the basis of the received measurement data such that the sum of the powder fill levels measured by the first fill level sensor and the second fill level sensor is (as) constant (as possible). In particular, closed-loop control by the control apparatus, which can then be a closed-loop control apparatus, to a constant sum of the powder fill levels measured by the fill level sensors can take place. This embodiment takes advantage of the above knowledge that a rise in the product amount in the filling apparatus of the production machine, in particular when using an intermittently working conveyor apparatus, requires a corresponding decline in the product amount in the conveyor reservoir of the conveyor apparatus, and vice versa. In the balanced state of the system, the sum of the powder fill levels in the filling apparatus and in the conveyor reservoir is thus constant. If the sum changes, this indicates an undesired changed mass stream through the system, for example, that the mixer is conveying too large an amount of product. In this case, the fill level in the conveyor reservoir will rise more quickly than the fill level in the filling apparatus decreases. The sum of the fill levels thus increases, and this change of the mass stream can be counteracted. Subsequently, a production parameter of the production machine can be controlled or respectively regulated on the basis of the sum of the fill levels measured by the fill level sensors. In order to avoid erroneous measurement data and thus an erroneous control or respectively closed-loop control during the conveying cycle, for example, of a pneumatic conveyor apparatus, it can be provided that the control apparatus pauses the control during the conveying cycle of the conveyor apparatus. This conveying cycle of the conveyor apparatus is relatively short compared to the resting time of the conveyor apparatus between the cycles. This resting time is particularly well suited for the control or respectively closed-loop control according to the invention. However, it would also be possible to perform the control or respectively closed-loop control without interruption and in doing so base it on the currently measured fill levels. The product amounts conveyed during a conveying cycle of the conveyor apparatus can then be estimated computationally.

According to another embodiment, it can be provided that the production machine is a rotary press, comprising a rotor rotatable by means of a rotary drive, wherein the rotor has an upper punch guide for upper punches of the rotary press and a lower punch guide for lower punches of the rotary press as well as a die plate arranged between the punch guides, wherein the punches interact with cavities of the die plate, further comprising a filling apparatus by which the powder material to be pressed is filled into the cavities of the die plate and on which the first fill level sensor is arranged, and at least one pressing apparatus which interacts during operation with the upper punches and with the lower punches to press the powder material in the cavities of the die plate, further comprising an ejector apparatus in which the pellets generated in the cavities are ejected.

The rotary press can in particular be a rotary tablet press. Product mixture to be processed in the rotary press is supplied to the die plate through the filling tube. The product mixture can be conveyed through the filling apparatus and the filling tube due to gravity. The filling tube can thus be a downcomer. The filling tube can be suitably arranged for this. For example, the longitudinal axis of the filling tube can be angled sufficiently with respect to horizontal, in particular, for example, can run vertically. The filling apparatus can also have at least one filling chamber into which the product mixture enters from the filling tube. The product mixture is supplied from the filling chamber to the cavities of the die plate, in particular in turn due to gravity, where the product mixture is pressed by the upper and lower punches in a manner known per se to form pellets, in particular tablets. The cavities can be formed by bores directly in the die plate. However, releasably fastened die sleeves in which the cavities are formed can also be arranged in the die plate.

According to a particularly practical embodiment, the control apparatus can be configured to control as a production parameter at least the rotational speed of the rotor of the rotary press on the basis of the received measurement data. Controlling the rotational speed of the rotor can influence the mass stream through the system in a simple and quickly controllable manner. An increased rotor speed thus leads to a processing of more product mixture over time.

The mixer can have a preferably horizontally aligned mixing tube in which a mixing apparatus for continuously mixing the pulverulent products is arranged. The mixing apparatus can comprise, for example, a mixing auger, which is rotated by means of a rotary drive of the mixer.

The first fill level sensor and/or the second fill level sensor can be a capacitive fill level sensor. As already explained, such capacitive fill level sensors allow a precise and contactless fill level measurement without disrupting the powder flow.

According to another embodiment, it can be provided that the filling apparatus has a filling tube on which a first measuring electrode of the first fill level sensor is arranged, which electrode forms a first electrical capacitor with a first reference electrode of the first fill level sensor so that an electric field can be formed between the first measuring electrode and the first reference electrode, and that the first measuring electrode is covered by an electrically conductive protective shield on its side facing away from the filling tube, wherein the protective shield is at ground potential.

Accordingly, according to another embodiment, it can provided that a second measuring electrode of the second fill level sensor is arranged on the conveyor reservoir, which electrode forms a second electrical capacitor with a second reference electrode of the second fill level sensor so that an electric field can be formed between the second measuring electrode and the second reference electrode, and that the second measuring electrode is covered by an electrically conductive protective shield on its side facing away from the conveyor reservoir, wherein the protective shield is at ground potential.

The first and second measuring electrodes arranged on the filling tube and the conveyor reservoir, respectively, each interact with a first or respectively second reference electrode. Together, the measuring and reference electrodes in each case form an electrical capacitor, similar to a plate capacitor. The first or respectively second measuring electrode extends here over a certain measurement region in the axial direction of the filling tube or respectively the conveyor reservoir. For example, this axial direction can correspond to the vertical direction. The reference electrodes can also each extend over this region. The electric field formed between the measuring electrodes and the reference electrodes in each case penetrates the inside of the filling tube or respectively the conveyor reservoir and thus the pulverulent product to be measured in a nondestructive manner. The capacitance of each of the capacitors formed depends on the permittivity of the medium penetrated by the electric field. Air has a different permittivity than the product mixture. As a result, the degree of coverage of the electrodes by the pulverulent product mixture can be derived using a capacitance measurement of the respective capacitor. The fill level can in turn be derived from this. Of course, a plurality of first or respectively a plurality of second measuring electrodes can also be provided. The reference electrodes can also each comprise a plurality of (lower) reference electrodes or respectively be formed by a plurality of (lower) reference electrodes.

In the aforementioned embodiment, the first or respectively second measuring electrode is each covered, in particular completely covered, by an electrically conductive and grounded protective shield on its side facing away from the filling tube or respectively the conveyor reservoir. The filling tube or respectively the conveyor reservoir can comprise, for example, of a metal, such as stainless steel. The protective shield can also be comprised of metal, for example, aluminum or also of stainless steel. On the basis of the knowledge that the active shielding described above for the fill level measurement of pulverulent products is not sufficient in particular in the present application to obtain reliable measurement results despite any external sources of disturbances, the previously mentioned embodiment is further based on the knowledge that conveying pulverulent products through the filling apparatus or respectively the conveyor reservoir can lead to a static charging of the product mixture which can influence the measurement results. Excluding external disturbances, for example, due to external electromagnetic fields or persons located in the vicinity of the fill level sensors, must take place reliably due to the necessary particularly high measuring accuracy. This is achieved by the electrically conductive protective shield at ground potential. It shields the measuring electrodes reliably from external electromagnetic sources of disturbance. The fill level of the product mixture in the filling tube or respectively the conveyor reservoir can be determined reliably. At the same time, complex arrangements with a plurality of measuring electrodes and complicated and unreliable plausibility assessments are avoided. The inner geometry of the filling tube or respectively the conveyor reservoir is maintained without disruption and the powder flow is not disturbed or influenced by the measurement sensors. External disturbances, for example, from electrical systems in the rotary press or from contact by an operator are not, unlike in the prior art, eliminated from the measurement results computationally, but effectively suppressed from the start.

According to another embodiment, the first measuring electrode can be arranged in an electrically nonconductive holding portion arranged on the filling tube and/or the second measuring electrode can be arranged in an electrically nonconductive holding portion arranged on the conveyor reservoir. In this manner, a further improved shielding is achieved. A non-conductive plastic, such as POM, can be used, for example. The holding portion can be covered as a whole to the outside by the protective shield. A pocket for the first or respectively second measuring electrode and, if applicable, other measuring electrodes can be arranged in the holding portion.

According to another embodiment, the holding portion can be arranged in an opening of the filling tube and/or of the conveyor reservoir. The filling tube or respectively the conveyor reservoir then has a cut-out into which the holding portion with the first or respectively second measuring electrode is arranged. In this manner, particularly good measuring access to the product mixture and thus a particularly exact measurement is achieved without the risk of a disturbance of the powder flow.

According to another embodiment, an electrically conductive tube portion located before and/or after the filling tube provided with the first measuring electrode can also be at ground potential and/or an electrically conductive tube portion located before and/or after the conveyor reservoir provided with the second measuring electrode can be at ground potential. The inventors have recognized that a static charging of the powder material of the product mixture occurs in the course of the conveying of the product mixture through the filling apparatus, in particular the filling tube, or respectively the conveyor reservoir. According to the findings of the inventors, this is caused by the friction between the powder material and the components of the filling apparatus or respectively of the conveyor reservoir conducting the powder material. This static charging is eliminated before the capacitive fill level measurement by grounding an electrically conductive tube portion located upstream of the filling tube or respectively conveyor reservoir provided with the first or respectively second measuring electrode, so that it cannot falsify the subsequent measurement. A further/repeated undesired static charging of the pulverulent material can also occur in the course of the further powder material conveying after the fill level measurement. This can negatively impact the processing result in the production machine. To prevent this, it can be practical to also ground an electrically conductive tube portion located downstream of the filling tube provided with the first measuring electrode or respectively of the conveyor reservoir provided with the second measuring electrode. These tube portions can also be comprised of, for example, of a metal, such as a stainless steel.

The first or respectively second reference electrode can also be arranged on the filling tube or respectively conveyor reservoir provided with the first measuring electrode. The reference electrode can then also be covered, in particular completely, by the electrically conductive protective shield on its side facing away from the filling tube or respectively the conveyor reservoir. The first or respectively second reference electrode can also be arranged in the electrically nonconductive holding portion.

The filling tube provided with the first measuring electrode and/or the conveyor reservoir, in particular its wall, provided with the second measuring electrode can also be at ground potential. In this manner, in addition to a particularly reliable measurement and an additional electromagnetic shielding, a static charging of the pulverulent product mixture in the filling tube or respectively conveyor reservoir provided with the first or respectively second measuring electrode can also be prevented or respectively eliminated.

According to another embodiment, the first reference electrode can be formed by the filling tube provided with the first measuring electrode and/or the second reference electrode can be formed by the conveyor reservoir, in particular its wall, provided with the second measuring electrode. In this manner, the first or respectively second measuring electrode forms the electrical capacitor directly with the filling tube or respectively the conveyor reservoir as a reference electrode. Thus, in comparison to the arrangement of the first or respectively second reference electrode on the filling tube or respectively on the conveyor reservoir, an enlarged reference electrode can be used as the basis for the capacitance measurement. In particular when the filling tube or respectively the conveyor reservoir and, if applicable, also the respective protective shield are also at ground potential, a particularly exact and reliable capacitance measurement can take place.

According to another embodiment, it can be provided that a third measuring electrode is also arranged on the filling tube, wherein the third measuring electrode and the first reference electrode form a third electrical capacitor so that an electric field can be formed between the third measuring electrode and the first reference electrode, and wherein the measurement region of the third measuring electrode is chosen such that it is covered completely at all times during operation of the rotary press by product mixture located in the filling tube. The extent in the longitudinal direction of the filling tube and thus the measurement region of the third measuring electrode is smaller here than the extent of the first measuring electrode in the longitudinal direction of the filling tube and thus its measurement region. For example, the extent of the third measuring electrode can be no more than 15%, preferably no more than 10%, of the first measuring electrode. The third measuring electrode can be located in particular parallel to the first measuring electrode and terminate substantially flush with its lower end or project past the lower end of the first measuring electrode. Providing such a third measuring electrode which is completely covered by the product mixture located in the filling tube during operation of the rotary press allows a fill level measurement even with different powder materials or changes in the composition of the powder material. It can thus be assumed when the third measuring electrode is completely covered with powder material that the electric field formed between it and the first reference electrode is formed completely within the powder material. If the extent of the third measuring electrode in the axial direction of the filling tube is known, the fill level of the product mixture can be derived computationally from the capacitance measured for the first measuring electrode even with different powder materials and without complex additional calibration measures. Thus, a measurement independent of the powder material or any changes in the composition of the powder material is possible. It has been shown that the accuracy of the measurement can be further improved in this manner.

According to another embodiment, it can be provided that a fourth measuring electrode is also arranged on the filling tube, wherein the fourth measuring electrode and the first reference electrode form a fourth electrical capacitor so that an electric field can be formed between the fourth measuring electrode and the first reference electrode, and wherein the measurement region of the fourth measuring electrode is chosen such that it is above the fill level of the product mixture in the filling tube at all times during operation of the rotary press. The extent in the longitudinal direction of the filling tube and thus the measurement region of the fourth measuring electrode is in turn smaller here than the extent of the first measuring electrode in the longitudinal direction of the filling tube and thus its measurement region. For example, the extent of the fourth measuring electrode can in turn be no more than 15%, preferably no more than 10%, of the first measuring electrode. The fourth measuring electrode can be located in particular parallel to the first measuring electrode and terminate substantially flush with its upper end or project past the upper end of the first measuring electrode. If the extent of the fourth measuring electrode in the axial direction of the filling tube is known, a measurement can take place by means of such a fourth measuring electrode, which is not, also not partially, covered by the product mixture in the filling tube during operation of the rotary press, while taking into account any properties of the filling apparatus, in particular the filling tube. In particular, changes to the measurement environment occurring during operation can be detected without influencing the product mixture and can be taken into account in the fill level measurement by means of the first measuring electrode.

In a corresponding manner, a fifth measuring electrode can also be arranged on the filling reservoir, wherein the fifth measuring electrode and the second reference electrode form a fifth electrical capacitor so that an electric field can be formed between the fifth measuring electrode and the second reference electrode, wherein the measurement region of the fifth measuring electrode is chosen such that it is covered completely by product mixture located in the conveyor reservoir during operation of the system. Accordingly, a sixth measuring electrode can also be arranged on the conveyor reservoir, wherein the sixth measuring electrode and the second reference electrode form a sixth electrical capacitor so that an electric field can be formed between the sixth measuring electrode and the second reference electrode, and wherein the measurement region of the sixth measuring electrode is chosen such that it is located above the fill level of the product mixture in the conveyor reservoir during operation of the rotary press. What has been said above in relation to the filling tube applies accordingly to these embodiments on the conveyor reservoir.

The third and/or the fourth and/or the fifth and/or the sixth measuring electrode can also be covered by the electrically conductive protective shield on its side facing away from the filling tube and/or the conveyor reservoir.

BRIEF DESCRIPTION OF THE DRAWINGS

An exemplary embodiment of the invention is explained in greater detail below based on figures. Schematically.

The same reference signs refer to the same objects in the figures unless indicated otherwise.

DETAILED DESCRIPTION OF THE INVENTION

Figure 1:
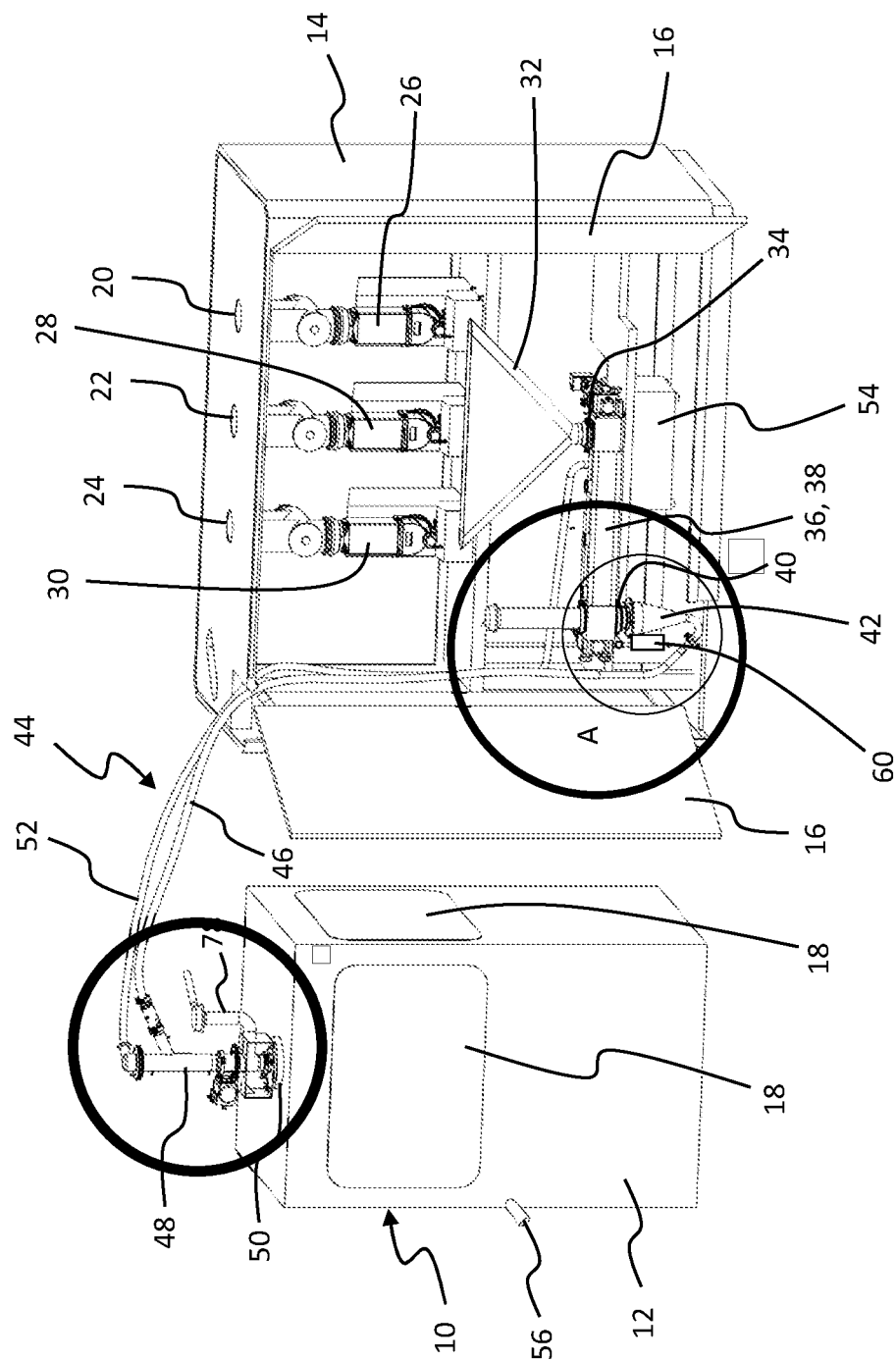
FIG. 1 illustrates a perspective side view of an embodiment of a system for continuously processing pulverulent products.

FIG. 1 shows a system for continuously processing pulverulent products, comprising a production machine 10, presently a rotary tablet press 10. The rotary tablet press 10 is arranged in a housing 12. A module housing 14 is arranged next to the rotary tablet press 10 on the same ground. In FIG. 1, the module housing 14 is shown with the doors 16 opened for purposes of illustration. The housing 12 of the rotary tablet press 10 has windows 18 which can also be opened for access to the rotary tablet press 10.

The module housing 14 has on its upper side three system inlets 20, 22, 24 through which the pulverulent products can be supplied, for example, active pharmaceutical ingredients and/or excipients. Each of the inlets 20, 22, 24 has a metering apparatus 26, 28, 30 through which the supplied pulverulent products are metered. In the example shown, a supply funnel 32, to which the pulverulent products supplied through the inlets 20, 22, 24 and the metering apparatuses 26, 28, 30 are conducted, is located downstream of the inlets 20, 22, 24 with the metering apparatuses 26, 28, 30. The outlet of the supply funnel 32 is connected to a mixer inlet 34 of a mixer 36. In the example shown, the mixer 36 has a horizontal mixer tube 38 in which a mixing apparatus is arranged, for example, a rotatable mixing auger. In the mixer tube 38, the pulverulent products supplied via the supply funnel 32 are mixed to form a product mixture, which is provided at a mixer outlet 40 of the mixer. The mixer outlet 40 is in connection with an, in the example shown, funnel-shaped conveyor reservoir 42 of a conveyor apparatus 44. The conveyor apparatus 44 also comprises a conveyor hose 46 connected to the outlet of the conveyor reservoir 42, the other end of which is connected via an outlet hopper 48 to a machine inlet 50 on the upper side of the housing 12 of the rotary tablet press 10. In the example shown, the conveyor apparatus 44 is a pneumatic vacuum conveyor apparatus 44. Accordingly, the conveyor apparatus 44 has a vacuum hose 52 and a vacuum generating unit 54. The vacuum generating unit 54 generates, via the vacuum hose 52, a vacuum at the outlet of the conveyor hose 46, by means of which the product mixture located in the conveyor reservoir 42 is conveyed through the conveyor hose 46 into the outlet hopper 48 and to the inlet 50 of the rotary tablet press 10. For this purpose, an outlet valve at the outlet of the conveyor hose 46 opens intermittently and then closes again after the respectively conveyed product amount has been let out. Then, this cycle is repeated so that the product mixture is conveyed intermittently out of the conveyor reservoir 42 from the mixer outlet 40 located at a vertically lower level to the machine inlet 50 of the rotary tablet press 10 arranged at a vertically higher level. In the rotary tablet press 10, tablets are produced from the supplied product mixture in a manner explained in more detail below, wherein the tablets are discharged at a machine outlet 56 of the rotary tablet press 10, where they can be supplied to further processing, for example, dedusting and/or packaging.

The system shown in FIG. 1 serves to continuously process pulverulent products to form end products produced in the production machine 10, in the example shown in particular to form tablets pressed in the rotary tablet press 10. The system can be contained, as explained above. Instead of a rotary tablet press 10, another production machine 10 could of course also be provided in the system, for example, a capsule filling machine. The structure explained above and the function of such a system are known in principle from WO 2020/260600 A1.

The system according to the invention shown in FIG. 1 differs from the known system in particular in that a first fill level sensor 58 explained in more detail below is arranged on a filling apparatus of the rotary tablet press 10, that a second fill level sensor 60 is arranged on the conveyor reservoir 42 of the conveyor apparatus, which sensor is indicated only in a very schematic manner in FIG. 1 and will be explained in more detail below with reference to FIG. 5, and by the evaluation according to the invention of the measurement signals from the fill level sensors 58, 60.

Figure 2:
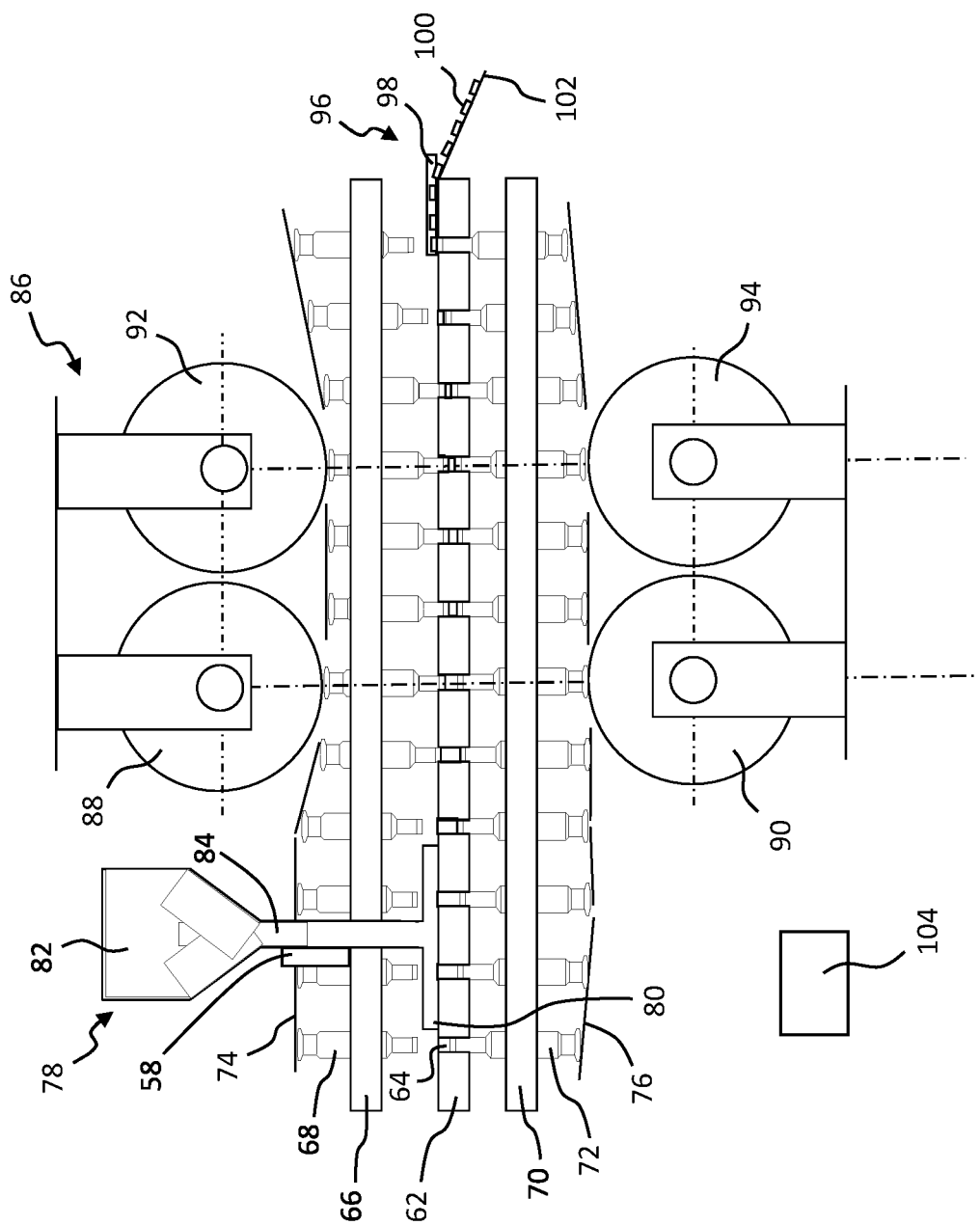
FIG. 2 illustrates a partial sectional view of an embodiment of a rotary press of the system shown in FIG. 1 in an unrolled representation of the rotor.

In FIG. 2, a rotary tablet press 10 used, for example, in the system shown in FIG. 1 is shown in an unrolled representation of the rotor. The rotary tablet press shown in FIG. 2 comprises a rotor rotatingly driven by a rotary drive (not shown in detail) with a die plate 62 having a plurality of cavities 64. The cavities 64 can be formed, for example, by bores in the die plate 62. The rotor further comprises a plurality of upper punches 68 guided in an upper punch guide 66 and a plurality of lower punches 72 guided in a lower punch guide 70, which run synchronously with the die plate 62. Each pair of an upper punch 68 and a lower punch 72 is arranged in a cavity 64. The axial movement of the upper punches 68 and lower punches 72 in the course of the rotation of the rotor is controlled by upper control curve elements 74 and lower control curve elements 76. The rotary tablet press also comprises a filling apparatus 78 which has a filling chamber 80. The filling apparatus 78 comprises a funnel-shaped filling material reservoir 82 which is in connection with the filling chamber 80 via a filling tube 84. In this manner, in the present example, the pulverulent product mixture enters into the filling chamber 80 through the filling tube 84 due to gravity and out of it again, again due to gravity, into the cavities 64 of the die plate 62 via a filling opening provided on the underside of the filling chamber 80. In addition, the rotary tablet press comprises a pressing apparatus 86. The pressing apparatus 86 possesses a preliminary pressing apparatus with an upper preliminary pressing roller 88 and a lower preliminary pressing roller 90 as well as a main pressing apparatus with an upper main pressing roller 92 and a lower main pressing roller 94. When passing through the pressing apparatus 86, the upper and lower punches 68, 72 are pushed into the cavities and in the process press the product mixture filled into the cavities to form tablets 100. The rotary tablet press further comprises an ejector apparatus 96, in the present case with a stripper 98 which supplies the tablets 100 produced in the rotary press and conveyed by the lower punches 72 and the upper side of the die plate 62 to a tablet discharge 102.

A control apparatus 104 controls the operation of the rotary press and is connected inter alia to the rotary drive of the rotor via lines (not shown in detail). Measurement results from the first fill level sensor 58 and the second fill level sensor 60 are also present at the control apparatus 104, which can simultaneously be a closed-loop control apparatus 104.

Figure 4:
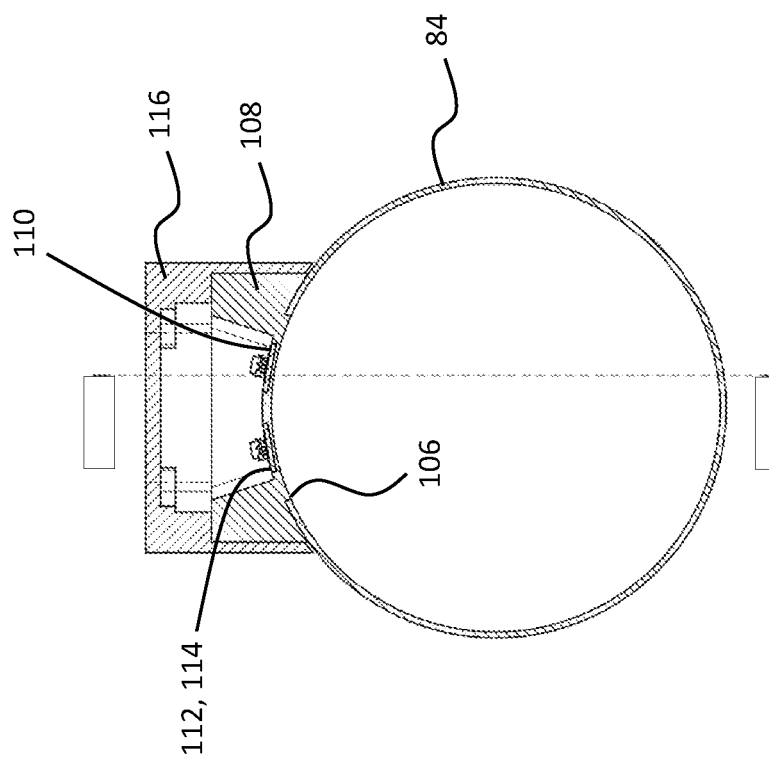
FIG. 4 illustrates a sectional view along the line A-A in FIG. 3.
Figure 3:
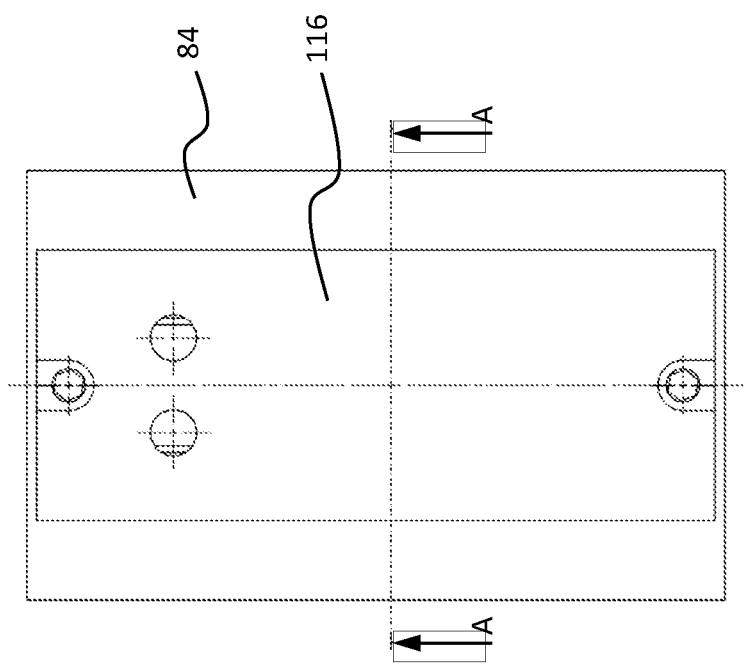
FIG. 3 illustrates a side view of an embodiment of a first fill level sensor of the system shown in FIG. 1.

With reference to FIGS. 3 and 4, first the first fill level sensor 58 arranged on the filling tube 84 will be explained in more detail. As can be seen in FIG. 4, the filling tube 84 has an opening 106 in which a holding portion 108 made of an electrically nonconductive material, for example, a plastic such as POM, is arranged. The holding portion 108 supports a first measuring electrode 110 extending in the axial direction of the filling tube 84 as well as third and fourth measuring electrodes 112, 114 arranged parallel to the first measuring electrode 110, each of which extend parallel to and over approximately 10% of the length of the first measuring electrode 110. The third measuring electrode 112 is arranged in the region of the lower end of the first measuring electrode 110 and the fourth measuring electrode 114 is arranged in the region of the upper end of the first measuring electrode 110. The holding portion 108 and with it the measuring electrodes 110, 112 and 114 are in addition covered by an electrically non-conductive protective shield 116, which is at ground potential, on their side facing away from the filling tube 84. The filling tube 84 is also at ground potential in the example shown. The filling tube 84 and the protective shield 116 can be comprised of, for example, of a metal. For example, the filling tube 28 can be comprised of a stainless steel and the protective shield 116 of aluminum.

In the exemplary embodiment shown in FIGS. 3 and 4, the filling tube 84 forms a first reference electrode for the measuring electrodes 110, 112 and 114. The measuring electrodes 110, 112 and 114 thus form three electrical capacitors with the filling tube 84 as the first reference electrode, so that an electric field can be formed between each of the measuring electrodes 110, 112, and 114 and the first reference electrode 84. During operation of the rotary press, the third measuring electrode 112 can be covered completely at any time by the product mixture located in the filling tube 84, while the fourth measuring electrode 114 can be located above the fill level of the product mixture in the filling tube 84. The first measuring electrode 110 forms with its longitudinal extent a measurement region for measuring the powder fill level in the filling tube 84. During operation, controlled by the control apparatus 104, an electric field is formed between each of the measuring electrodes 110, 112 and 114 and the filling tube 84 serving as the first reference electrode, and the capacitance of each of the formed capacitors is measured, again by the control apparatus 104. The control apparatus 104 derives the powder fill level in the filling tube 84 from the capacitance measurement. External disturbances can be largely minimized by the protective shield 116 at ground potential. By using the filling tube 84, which is also at ground potential, as a reference electrode, a particularly exact and reliable capacitance measurement is possible. By means of the third and fourth measuring electrodes 112, 114, influences on the measurement result resulting from changes to the powder material or properties of the filling tube 84 can be eliminated.

Figure 5:
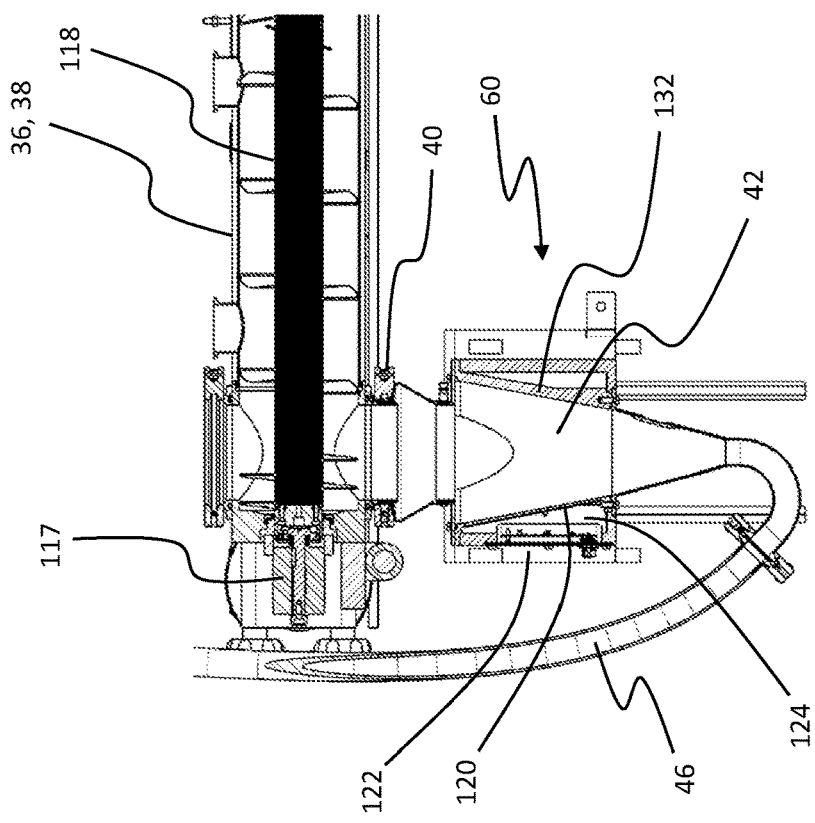
FIG. 5 illustrates an enlarged view of section A in FIG. 1.

Based on the partial sectional representation of the cut-out A from FIG. 1 in FIG. 5, the structure of the second fill level sensor 60, which is only indicated schematically in FIG. 1, shall be explained in more detail. In the partially cut representation in FIG. 5, the mixing auger 118 which is arranged in the mixer tube 38 and which can be rotated by means of a rotary drive 117 can be seen. It should be noted that some of the components to be seen in the cut-out A illustrated in FIG. 1 are not shown in FIG. 5 for purposes of illustration.

In the example shown, the second fill level sensor 60 has a second measuring electrode 120 which in the example shown forms a part of the wall 132 of the funnel-shaped conveyor reservoir 42 in the region of an opening. The wall 132 of the conveyor reservoir 42 simultaneously forms a second reference electrode in the example shown. The wall 132 of the conveyor reservoir 42 can also consist of a metal, for example, a stainless steel, and can preferably be at ground potential. The second measuring electrode 120 thus forms an electrical capacitor with the wall 132 of the conveyor reservoir 42 designed as a second reference electrode, so that an electric field can be formed respectively between the second measuring electrode 120 and the second reference electrode 132. The second measuring electrode 120 is in turn covered by a protective shield 122, which is at ground potential, on its side facing away from the conveyor reservoir 42. The protective shield 122 can consist, for example, of a metal, for example, of aluminum.

During operation, again controlled by the control apparatus 104, an electric field is formed between the second measuring electrode 120 and the wall 132 of the conveyor reservoir 42 serving as the second reference electrode and in turn the capacitance of the formed capacitor is measured, again by the control apparatus 104. The control apparatus 104 derives the powder fill level in the conveyor reservoir 42 from the capacitance measurement. As in the case of the first fill level sensor 58, it is also ensured for the second fill level sensor 60 by the protective shield 122 that external interferences are minimized. As already explained with regard to the first fill level sensor 58, it would also naturally be possible in the case of the second fill level sensor 60 to provide a fifth measuring electrode and a sixth measuring electrode in an analogous manner, corresponding to the third and fourth measuring electrodes 112, 114 of the first fill level sensor 58 explained above. In the example shown, the second measuring electrode 120 is also held by a holding portion 124, made of, for example, a plastic such as POM, as can be seen in FIG. 5.

Figure 6:
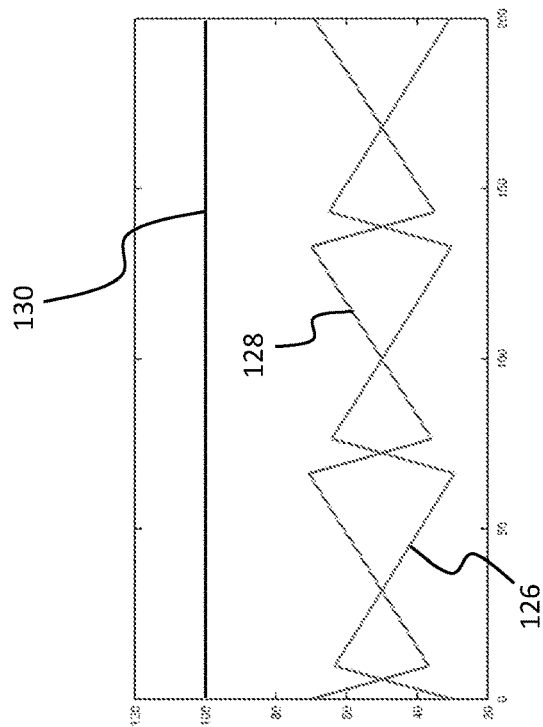
FIG. 6 illustrates an embodiment of a diagram for illustrating the control or respectively closed-loop control according to the disclosure.

Based on FIG. 6, the evaluation according to the invention of the measurement signals provided by the two fill level sensors 58, 60 shall be explained. The fill level is shown over time in arbitrary units. The curve denoted with reference sign 126 shows the fill level measured by the first fill level sensor 58 in the filling tube 84 of the filling apparatus 78 of the rotary tablet press 10, and the curve denoted with reference sign 128 shows the fill level measured by the second fill level sensor 60 in the conveyor reservoir 42 of the conveyor apparatus 44. Reference sign 130 shows a further curve that corresponds to the sum of the fill levels 126 and 128.

It can first be seen that the fill level curves 126 and 128 are largely opposite in the idealized representation in FIG. 6. The relatively short and steep increases and decreases of the curves each correspond to the suction or conveying cycle, respectively, of the pneumatic vacuum conveyor apparatus 44. The longer portions between them in which the fill level 126 in the filling tube 84 of the rotary tablet press 10 falls and the fill level 128 in the conveyor reservoir 42 rises, corresponds to the time periods between the suction cycles of the conveyor apparatus 44, in which the powder mixture supplied to the rotary tablet press 10 is processed while the conveyor reservoir 42 is refilled from the mixer 36. In the idealized balanced state of the system according to the invention shown in FIG. 6, the sum of both fill levels is constant, as can be seen in the curve 130. This is the sought-after balanced state, in which the mass stream through the system is constant.

In the system according to the invention, the control apparatus 104 finds the sum of the fill levels measured by the first and second fill level sensors 58, 60, meaning the curves 126 and 128, so that the curve 130 results. If the control apparatus 104 observes a rise or fall of the sum, meaning the curve 130, over time, this indicates a changing mass stream through the system. To counteract this change of the mass stream, the control apparatus 104 controls on this basis a production parameter of the production machine 10, in the example shown the rotor rotational speed of the rotor of the rotary tablet press 10. An increase in the rotor rotational speed leads accordingly to a faster processing of the product mixture supplied to the rotary tablet press 10 and a lower rotor rotational speed leads to a slowed processing of the product mixture. In this manner, the mass stream through the system can be influenced by the control apparatus 104. As already explained, the control apparatus 104 can be in particular a closed-loop control apparatus 104 which regulates the system according to the invention by controlling the rotor rotational speed of the rotary tablet press 10 on the basis of the fill levels measured by the first and second fill level sensors 58, 60 to a constant sum of the measured fill levels, meaning a constant mass stream.

LIST OF REFERENCE SIGNS

10 Production machine/rotary tablet press
12 Housing
14 Module housing
16 Doors
18 Windows
20 System inlet
22 System inlet
24 System inlet
26 Metering apparatus
28 Metering apparatus
30 Metering apparatus
32 Supply funnel
34 Mixer inlet
36 Mixer
38 Mixer tube
40 Mixer outlet
42 Conveyor reservoir
44 Conveyor apparatus
46 Conveyor hose
48 Outlet hopper
50 Machine inlet
52 Vacuum hose
54 Vacuum generating unit
56 Machine outlet
58 First fill level sensor
60 Second fill level sensor
62 Die plate
64 Cavities
66 Upper punch guide
68 Upper punches
70 Lower punch guide
72 Lower punches
74 Upper control curve elements
76 Lower control curve elements
78 Filling apparatus
80 Filling chamber
82 Filling material reservoir
84 Filling tube
86 Pressing apparatus
88 Upper preliminary pressing roller
90 Lower preliminary pressing roller
92 Upper main pressing roller
94 Lower main pressing roller
96 Ejector apparatus
98 Stripper
100 Tablets
102 Tablet discharge
104 Control apparatus
106 Opening 108 Holding portion
110 First measuring electrode
112 Third measuring electrode
114 Fourth measuring electrode
116 Protective shield
117 Rotary drive
118 Mixing auger
120 Second measuring electrode
122 Protective shield
124 Holding portion
126 Curve
128 Curve
130 Curve
132 Wall of the conveyor reservoir

The invention claimed is:

1. A system for continuously processing pulverulent products, the system comprising:
at least two system inlets for pulverulent products;
a mixer comprising at least one mixer inlet connected to the at least two system inlets and a mixer outlet, wherein the mixer is configured to continuously mix the pulverulent products received at the at least one mixer inlet into a product mixture that is dispensed at the mixer outlet;
a production machine comprising a filling apparatus, a machine inlet that is connected the mixer outlet, and a machine outlet, wherein the production machine is configured to continuously process the product mixture from the mixer outlet into end products dispensed at the machine outlet;
a conveyor apparatus configured to convey the product mixture from the mixer outlet to the machine inlet, wherein the conveyor apparatus comprises:
a first fill level sensor positioned on the filling apparatus and configured to measure a fill level of the product mixture in the filling apparatus of the production machine, and
a second fill level sensor positioned on a conveyor reservoir arranged between the mixer outlet and the conveyor apparatus and configured to measure a fill level of the product mixture in the conveyor reservoir; and
a control apparatus in electrical communication with the first and second fill level sensors and configured to:
receive measurement data from the first fill level sensor and the second fill level sensor, and
control at least one production parameter of the production machine based on a correlation between the received measurement data from the first and second fill level sensors.

2. The system according to claim 1, wherein the mixer outlet is positioned at a lower level than the machine inlet.

3. The system according to claim 1, wherein the conveyor apparatus is a pneumatic conveyor apparatus configured to convey the product mixture intermittently from the mixer outlet to the machine inlet.

4. The system according to claim 3, wherein the pneumatic conveyor apparatus is a dense-phase suction conveyor apparatus.

5. The system according to claim 1, wherein the control apparatus is configured to control the at least one production parameter of the production machine based on the received measurement data such that a sum of powder fill levels measured by the first fill level sensor and the second fill level sensor remains approximately constant.

6. The system according to claim 1, wherein the production machine is a rotary press comprising:
a rotor configured to be rotated by a rotary drive, wherein the rotor comprises:
an upper punch guide for upper punches of the rotary press,
a lower punch guide for lower punches of the rotary press, and
a die plate defining a plurality of cavities and positioned between the upper and lower punch guides, wherein the punches interact with the plurality of cavities,
the filling apparatus configured to dispense the product mixture into the plurality of cavities,
at least one pressing apparatus configured to interact with the upper punches and with the lower punches to press the product mixture in the plurality of cavities into pellets, and
an ejector apparatus configured to eject the pellets from the plurality of cavities.

7. The system according to claim 6, wherein the at least one production parameter is a rotational speed of the rotor of the rotary press.

8. The system according to claim 1, wherein the mixer comprises a horizontally aligned mixer tube configured to house a mixing apparatus of the mixer.

9. The system according to claim 1, wherein at least one of: (1) the first fill level sensor; and (2) the second fill level sensor, is a capacitive fill level sensor.

10. The system according to claim 9, wherein the filling apparatus comprises a filling tube configured to hold a first measuring electrode of the first fill level sensor, wherein the first measuring electrode forms a first electrical capacitor with a first reference electrode of the first fill level sensor so that an electric field is formed between the first measuring electrode and the first reference electrode, wherein the first measuring electrode is covered by a first electrically conductive protective shield on a side thereof facing away from the filling tube, and wherein the first electrically conductive protective shield is at ground potential.

11. The system according to claim 10, wherein the second fill level sensor comprises a second measuring electrode positioned on the conveyor reservoir, wherein the second measuring electrode forms a second electrical capacitor with a second reference electrode of the second fill level sensor to form an electric field between the second measuring electrode and the second reference electrode, wherein the second measuring electrode is covered by a second electrically conductive protective shield on a side thereof facing away from the conveyor reservoir, and wherein the second electrically conductive protective shield is at ground potential.

12. The system according to claim 11, wherein at least one of: (1) the first measuring electrode is positioned in an electrically nonconductive holding portion on the filling tube; and (2) the second measuring electrode is positioned in an electrically nonconductive holding portion on the conveyor reservoir.

13. The system according to claim 12, wherein at least one of: (1) the holding portion on the filling tube is located in an opening of the filling tube; and (2) the holding portion on the conveyor reservoir is located in an opening of the conveyor reservoir.

14. The system according to claim 13, further comprising an electrically conductive tube portion located one of: (1) before; and (2) after the filling tube, wherein the electrically conductive tube portion is also at ground potential.

15. The system according to claim 13, further comprising an electrically conductive tube portion located one of: (1)

before; and (2) after the conveyor reservoir, wherein the electrically conductive tube portion is also at ground potential.

16. The system according to claim 11, wherein the conveyor reservoir and the second measuring electrode are also at ground potential.

17. The system according to claim 11, wherein the second reference electrode is formed by the conveyor reservoir provided with the second measuring electrode.

18. The system according to claim 10, wherein the filling tube comprises the first measuring electrode.

19. The system according to claim 10, wherein the first reference electrode is formed by the filling tube provided with the first measuring electrode.

\* \* \* \* \*